United States Patent [19]

Haruki

[11] Patent Number: 4,719,327
[45] Date of Patent: Jan. 12, 1988

[54] ELECTRICAL DISCHARGE MACHINING POWER SUPPLY

[75] Inventor: Obara Haruki, Sagamihara, Japan

[73] Assignee: Fanuc Ltd., Minamitsuru, Japan

[21] Appl. No.: 834,242

[22] PCT Filed: Jun. 19, 1985

[86] PCT No.: PCT/JP85/00347

§ 371 Date: Feb. 13, 1986

§ 102(e) Date: Feb. 13, 1986

[87] PCT Pub. No.: WO86/00250

PCT Pub. Date: Jan. 16, 1986

[30] Foreign Application Priority Data

Jun. 22, 1984 [JP] Japan ............................ 59-128827

[51] Int. Cl.4 .............................................. B23H 1/02
[52] U.S. Cl. ................................................... 219/69 C
[58] Field of Search ................... 219/69 P, 69 S, 69 C

[56] References Cited

U.S. PATENT DOCUMENTS

| | | | |
|---|---|---|---|
| 4,376,880 | 3/1983 | Inoue | 219/69 M |
| 4,395,612 | 7/1983 | Izumiya | 219/69 P |
| 4,469,927 | 9/1984 | Obara et al. | 219/69 G |

FOREIGN PATENT DOCUMENTS

| | | | |
|---|---|---|---|
| 119197 | 9/1979 | Japan | 219/69 P |
| 101336 | 8/1980 | Japan | 219/69 C |
| 101337 | 8/1980 | Japan | 219/69 C |
| 114622 | 9/1981 | Japan | 219/69 C |
| 119318 | 9/1981 | Japan | 219/69 C |
| 57-89521 | 6/1982 | Japan | 219/69 P |
| 57-96726 | 6/1982 | Japan | 219/69 P |
| 206311 | 12/1983 | Japan | 219/69 P |

OTHER PUBLICATIONS

"Wire-Cut Electrical Discharge Machining Techniques", p. 25, edited by Nagao Saito, published by Nikkan Kogyo Shimbun (Japanese language).

Primary Examiner—J. R. Scott
Assistant Examiner—Geoffrey S. Evans
Attorney, Agent, or Firm—Staas & Halsey

[57] ABSTRACT

An electrical discharge machining power supply of the type which controls the charging current of a discharge capacitor (C) by switching elements (Tr1, Tr2). A large current charging circuit (A) is turned on and off at a pulse width equal to that of a discharge current pulse of the discharge capacitor (C), and is provided in parallel with a small current charging circuit (B) the on-off action of which is controlled at a period longer than that of the large current charging circuit. The large current charging circuit (A) takes part in a charging opertion only when the small current charging circuit (B) is on, and the charging voltage of the discharge capacitor (C) is less than a predetermined value.

7 Claims, 6 Drawing Figures

ELECTRICAL DISCHARGE MACHINING POWER SUPPLY

BACKGROUND OF THE INVENTION

This invention relates to an electrical discharge machining power supply and, more particularly, to an electrical discharge machining power supply with which an excellent machined surface can be obtained by stabilizing electrical discharge and improving the cut-off of electric current.

FIG. 3 is a diagram of the arrangement of a wire-cut electrical discharge machine, in which numeral 1 denotes an electrical discharge machining power supply, 2 an upper wire guide, 3 a lower wire guide, 4 an XY table, 5 a workpiece, 6 a wire electrode, 7 an X-axis servomotor, 8 a Y-axis servomotor, 9 a dielectric treating tank, 10 a CNC, and 11 a machining command tape. A wire-cut electrical discharge machine of this type is illustrated in, for example, U.S. Pat. No. 4,467,166. The electrical discharge machining power supply 1, which produces a spark discharge across the workpiece 5 and wire electrode 6, is adapted to generate a pulse-shaped voltage impressed across the wire electrode 6 and workpiece 5. The specific construction of the electrical discharge machining power supply will now be described in detail.

FIG. 4 shows a transistor-controlled capacitor discharge circuit used in the above electrical discharge machining power supply 1. The technique used here is described in, for example, "Wire-cut Electrical Discharge Machining Techniques", p. 25, edited by Nagao Saito, published by Nikkan Kogyo Shimbun. The circuit includes transistorized switching elements inserted in the charging circuit section of the discharge circuit of a capacitor C. With this circuit, the peak Ip of a discharge current can be changed by switching transistors Tr1, Tr2 through use of a control circuit. This circuit enables the power supply side and the discharge electrodes to be cut off from each other by the switching elements, so that the power supply can be opened when a discharge current is flowing between the discharge electrodes. Accordingly, in-flow of an electric current in a state where insulation recovery has not been attained can be prevented. Further, with the circuit shown in FIG. 4, the discharge current has a high peak Ip and the discharge current pulse obtained has a narrow pulse width in comparison with a transistor discharge circuit. For these reasons, the circuit is widely employed as a power supply for wire electrical discharge machines, machines for forming small holes and special-purpose machines for carbide alloys.

Thus, with a transistor-controlled capacitor discharge circuit, electrical discharge machining is possible at a high machining speed by virtue of a discharge current having a high peak value Ip and a small pulse width. Where finishing machining is concerned, however, discharge current cut-off is poor, thus leaving a trail, and the charging current of the capacitor is caused to fluctuate by leakage current across the discharge electrodes, so that stable discharge cannot be achieved.

SUMMARY OF THE INVENTION

An object of the present invention is to provide an electrical discharge machining power supply for controlling the charging current of a discharge capacitor by switching elements, which power supply enables finishing machining for an excellent surface smoothness, and in which a stable discharge is obtained by suppressing fluctuation of charging voltage.

In order to attain the object of the present invention, the present invention provides an electrical discharge machining power supply for controlling the charging current of a discharge capacitor by switching elements, the machining power supply including a small current charging circuit whose switching is controlled by a pulse having a pulse width larger than a discharge current pulse width of the discharge capacitor, a large current charging circuit connecting in parallel with the small current charging circuit and switched on the basis of a pulse having a pulse width smaller than the above mentioned pulse width, and control means for controlling operation of at least the large current charging circuit only when the small current charging circuit is in a charging state.

According to the present invention, cut-off of the capacitor discharge circuit can be improved and discharge can be maintained in a stable state. This makes it possible to raise the machined precision of a surface machined by electrical discharge and to form a machined surface having a surface smoothness which is uniformly excellent. Particularly, in finishing electrical discharge machining, how the electrical discharge machining energy is supplied to the machined surface is a factor which determines the quality of the machined product. The present electrical discharge machining power supply is well-suited for such finishing electrical discharge machining and contributes greatly to an improvement in the quality of the machined product.

DETAILED DESCRIPTION OF THE PREFERRED EMBODIMENT

An embodiment of the present invention will now be described in detail with reference to the drawings.

Figure 1A:
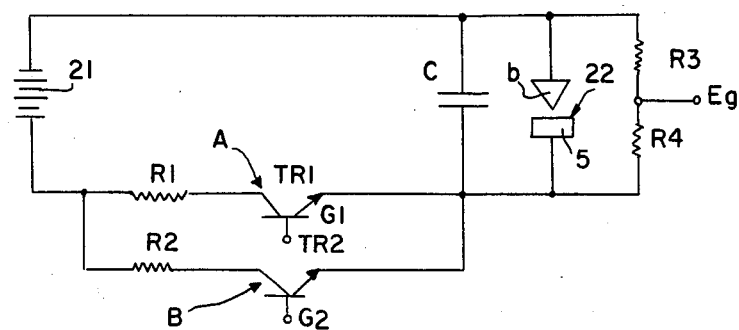
FIGS. 1(a) and 1(b) are circuit diagrams of an electrical discharge machining power supply embodying the present invention.

FIGS. 1(a) and (b) are circuit diagrams of an electrical discharge machining power supply according to the present invention. In these Figures, Tr1, Tr2 denote transistors serving as switching elements, and R1, R2 represent resistors for limiting current during charging. To make the circuit including the transistor Tr1 function as a large current charging circuit A and the circuit including the transistor Tr2 function as a small current charging circuit B, the resistance value of resistor R1 is made smaller than that of resistor R2; in other words, the resistance values are set in such a manner that R1<R2 will hold. R3, R4 denote voltage dividing circuits for measuring voltage during a discharge interval, C denotes a capacitor, numeral 21 designates a DC power supply, and numeral 22 designates an electrical discharge machining section including a workpiece 5 and a wire electrode 6. Further, numeral 23 denotes a first oscillator for generating pulses of a comparatively low frequency at a duty of approximately 50%, 24 a second oscillator for generating pulses of a higher frequency and smaller pulse width in comparison with the first oscillator, 25 and 27 AND circuits, 26 a comparator, and 28, 29 preamplifiers. Output terminals G1, G2 in FIG. 1(b) naturally are connected to gates G1, G2 of the transistors in FIG. 1(a).

Figure 1B:
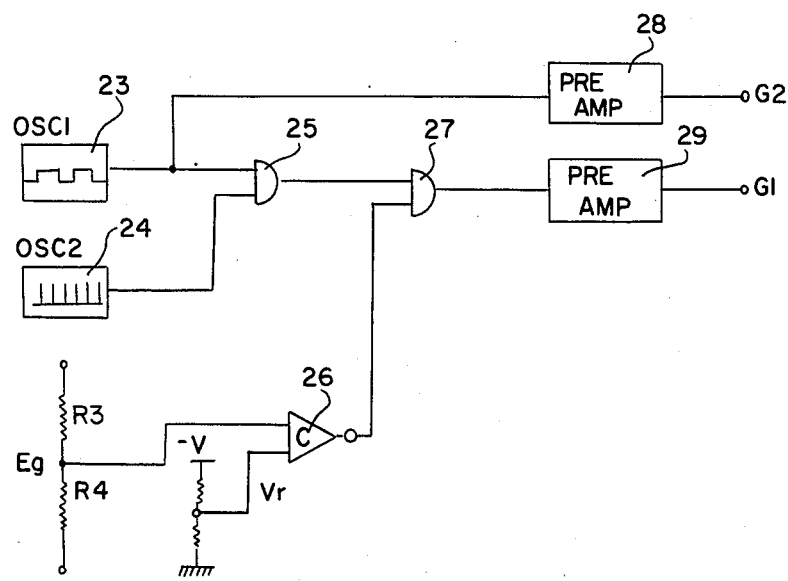

FIGS. 2(a) through 2(d) are waveform diagrams associated with various portions of the circuits shown in FIGS. 1(a) and 1(b).

The operation of the electrical discharge machining power supply will now be described on the basis of these drawings.

Figure 2:
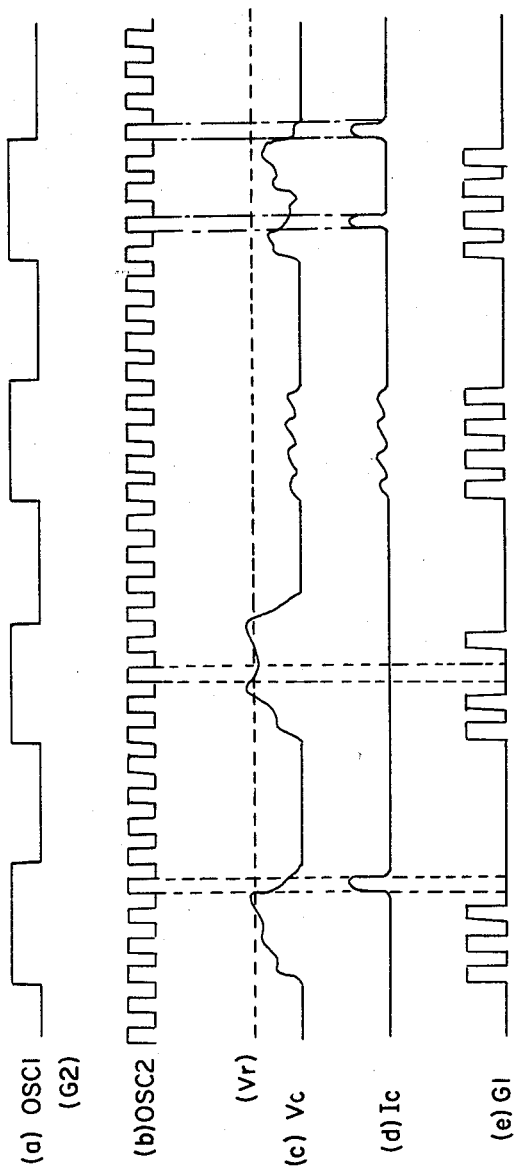
FIG. 2 shows waveforms (a) through (e) of signals associated with various portions of the circuit of FIG. 1.
Figure 3:
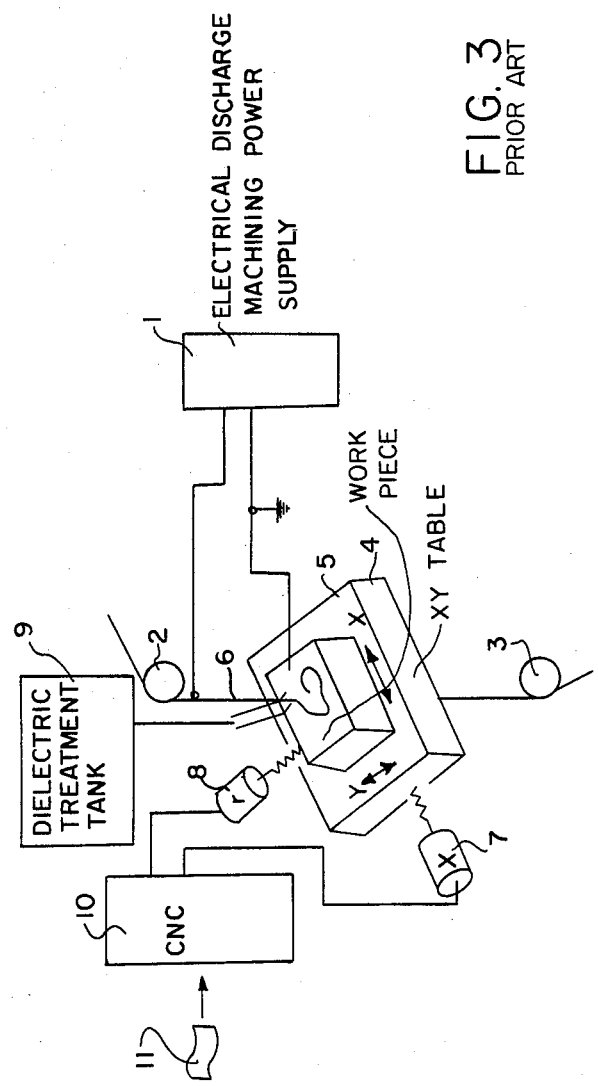
FIG. 3 is an overall view of an electrical discharge machining system.
Figure 5:
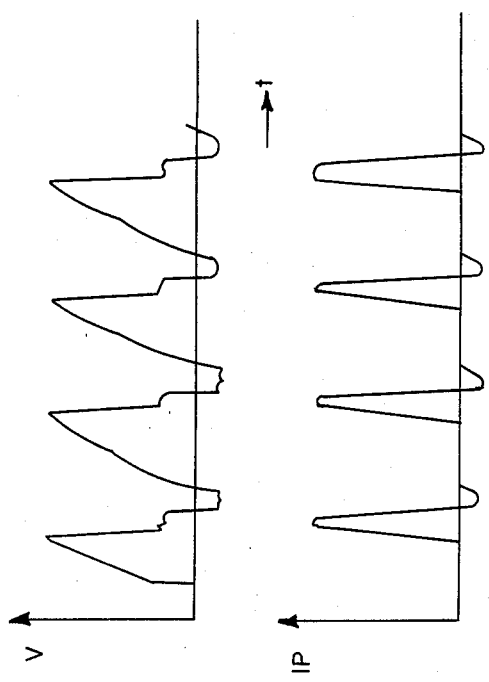
FIG. 5 is a waveform diagram of voltage (V) and discharge current (Ip) across discharge electrodes in FIG. 4.
Figure 4:
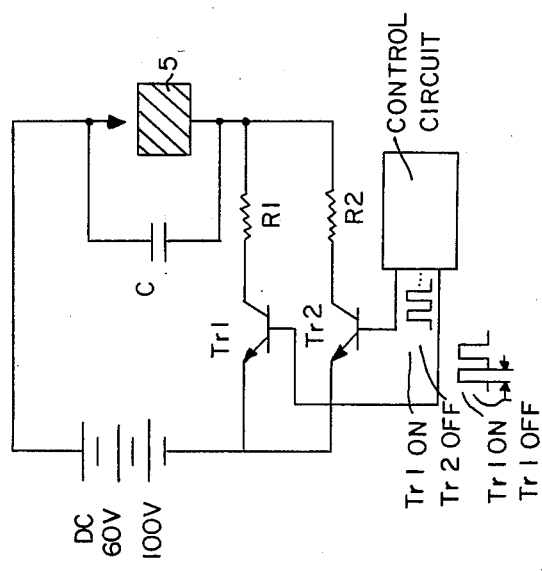
FIG. 4 is a circuit diagram of a conventional transistor-controlled capacitor discharge circuit.

First, as shown in FIG. 2(a), the first oscillator 23 generates a signal having a large pulse width (low frequency). The signal is amplified by the preamplifier 28, so that a signal of the kind shown in FIG. 2(a) is applied to the gate G2 of the transistor Tr2.

Meanwhile, as shown in FIG. 2(b), the second oscillator 24 generates a signal having a higher frequency and smaller pulse width in comparison with the first oscillator 23. The AND circuit 25 takes the AND of this signal and the above-mentioned signal of large pulse width obtained from the first oscillator 23, and applies the resulting signal to one input terminal of the AND circuit 27.

The voltage Vc of the capacitor C, namely the voltage across discharge electrodes, is divided by the voltage dividing resistors R3, R4 and is thus detected as a voltage Eg. The detected voltage Eg is compared with a reference voltage Vr by the comparator 26. When the voltage Vc of capacitor C surpasses the reference voltage Vr, as shown in FIG. 2(c), the comparator 26 outputs a signal. Thus, overcharging of the capacitor C is monitored. When the comparator 26 generates the output signal, control is effected in such a manner that a signal applied to the gate G1 of transistor Tr1 is turned off, as shown in FIG. 2(e). In other words, charging of the large current circuit is performed intermittently with regularity at the short pulse width under a condition where the capacitor C has not attained the overcharged state. However, when the capacitor C becomes overcharged, supply of the pulses to the gate G1 of transistor Tr1 in the large current circuit is reduced and the charging current is suppressed. In other words, overcharging of the capacitor C can be prevented automatically. Note that the preamplifier 29 is provided between the gate circuit 27 and the gate G1 of transistor Tr1.

When the capacitor C is charged, as depicted in FIG. 2(c), a discharge current Ic from the capacitor C flows between the electrodes, as illustrated in FIG. 2(d), so that electrical discharge machining is carried out.

In the circuit arrangement of this electrical discharge machining power supply, the small current charging circuit B comprising the transistor Tr2 and resistor R2 is connected in parallel with the large current charging circuit A comprising the transistor Tr2 and resistor R1 which pass a charging current greater than that of the above circuit. In addition, the small current charging circuit B limits the charging current to a small current. The result is excellent charging current cut-off. In other words, the charging current does not continue after the discharge of the capacitor C. Further, since the control pulse width of the small current charging circuit B is large, discharge can be stabilized and thus maintained.

Meanwhile, the large current charging circuit A is turned on and off at a very small pulse width. This pulse width is made the same as the discharge current width of capacitor C. By adopting such an arrangement, inflow of the discharge current of capacitor C can be prevented. The reason for adopting the large current is that the charging voltage of capacitor C would fluctuate due to current leakage across the electrode gap if only a small current were used and; the large current prevents this fluctuation of the charging voltage.

In the present embodiment, it has been described that transistors are used to switch the charging circuits, though it goes without saying that switching elements such as thyristors can be used instead.

The present invention is not limited to the illustrated embodiment but can be modified in various ways in accordance with the gist of the present invention, such modifications being within the scope of the invention.

The present invention is applicable to wire-cut electrical discharge machining and can also be used in power supplies for engraving-type electrical discharge machining.

What is claimed is:

1. An electrical discharge machining power supply, connected to receive first and second pulse signals, for controlling a charging current of a discharge capacitor having a discharge current with a discharge current pulse width, by switching elements, comprising:
   a small current charging circuit, coupled to the discharge capacitor and connected to receive the first pulse signal, whose switching is controlled by the first pulse signal, the first pulse signal having a pulse width larger than the discharge current pulse width of the discharge capacitor;
   a large current charging circuit connected in parallel with said small current charging circuit and connected to receive the second pulse signal, said large current charging circuit switched on the basis of the second pulse signal, the second pulse signal having a pulse width smaller than the pulse width of the first pulse signal; and
   control means for controlling operation of at least said large current charging circuit so that said large current charging circuit is switched to a charging state only when the small current charging circuit is in a charging state.

2. An electrical discharge machining power supply for controlling a charging current of a discharge capacitor, having a discharge-current pulse, by switching elements, comprising:
   a first switching element and a first resistor connected in series with the discharge capacitor;
   a first oscillator, coupled to said first switching element, for oscillating at a period having a pulse width larger than the width of the discharge-current pulse of the discharge capacitor to control switching of said first switching element;
   a series circuit of a second switching element and a second resistor connected in parallel with the series circuit of said first switching element and said first resistor, said second resistor having a resistance value smaller than the resistance value of said first resistor;
   a second oscillator, coupled to said second switching element, for oscillating at a period having a pulse width substantially equal to the pulse width of the discharge-current pulse of the discharge capacitor to control switching of said second switching element; and control means for applying an output from the second oscillator to said second switching element only when said first switching element is in an on state and the charging voltage of the discharge capacitor is less than a predetermined value.

3. An electrical discharge machining power supply for controlling the supply of a charging current to a discharge capacitor having a discharge current with a discharge current pulse width, comprising:

a first current charging circuit connected in series with the discharge capacitor, said first current charging circuit including a first switching element;

a first oscillator, coupled to said first switching element of said first current charging circuit, for providing a first pulse signal having a pulse width larger than the pulse width of the discharge current pulse of the discharge capacitor, said first oscillator for controlling the switching of said first switching element;

a second current charging circuit connected in parallel with said first current charging circuit, said second current charging circuit including a second switching element, said second current charging circuit for providing a larger current than said first current charging circuit;

a second oscillator, coupled to said second switching element, for providing a second pulse signal having a pulse width substantially equal to the pulse width of the discharge current of the discharge capacitor; and control means for receiving the first and second pulse signals from said first and second oscillators, and for applying the second pulse signal to said second switching element to control the switching of said second switching element only when the first pulse signal indicates that said first switching element is controlled to be in an on state and the voltage across the discharge capacitor is less than a predetermined value.

4. An electrical discharge machining power supply according to claim 3, wherein said control means comprises:

means for detecting a voltage proportional to the voltage across the discharge capacitor;

means for comparing the proportional voltage with the predetermined value and for generating a gate signal; and gate means for receiving the first and second pulse signals and the gate signal, and for providing the second pulse signal to said second switching element in dependence upon the gate signal.

5. An electrical discharge machining power supply according to claim 4, wherein said voltage detecting means comprises a voltage divider circuit and wherein said comparing means comprises a comparator.

6. An electrical discharge machining power supply according to claim 4, wherein said first and second switching elements comprise transistors.

7. An electrical discharge machining power supply according to claim 3, wherein:

said first and second switching elements comprise first and second transistors, respectively;

said first current charging circuit comprises said first transistor and a first resistor connected to said first transistor; and said second current charging circuit comprises said second transistor and a second resistor connected in series with said second transistor, said second resistor having a resistance value smaller than the resistance value of said first resistor.

* * * * *

UNITED STATES PATENT AND TRADEMARK OFFICE
CERTIFICATE OF CORRECTION

PATENT NO. : 4,719,327

DATED : January 12, 1988

INVENTOR(S) : Haruki OBARA

It is certified that error appears in the above-identified patent and that said Letters Patent is hereby corrected as shown below:

Front Page      [19] "Haruki" should be --Obara--;

Front Page      [75] "Obara Haruki" should be --Haruki Obara--.

Signed and Sealed this

Ninth Day of August, 1988

Attest:

DONALD J. QUIGG

*Attesting Officer*      *Commissioner of Patents and Trademarks*